A. C. BORZNER.
MANUFACTURE FROM CELLULOSE OF A FIREPROOF SUBSTITUTE FOR EXCELSIOR FOR BEDDING AND PACKING PURPOSES.
APPLICATION FILED JAN. 21, 1915.
1,165,062. Patented Dec. 21, 1915.
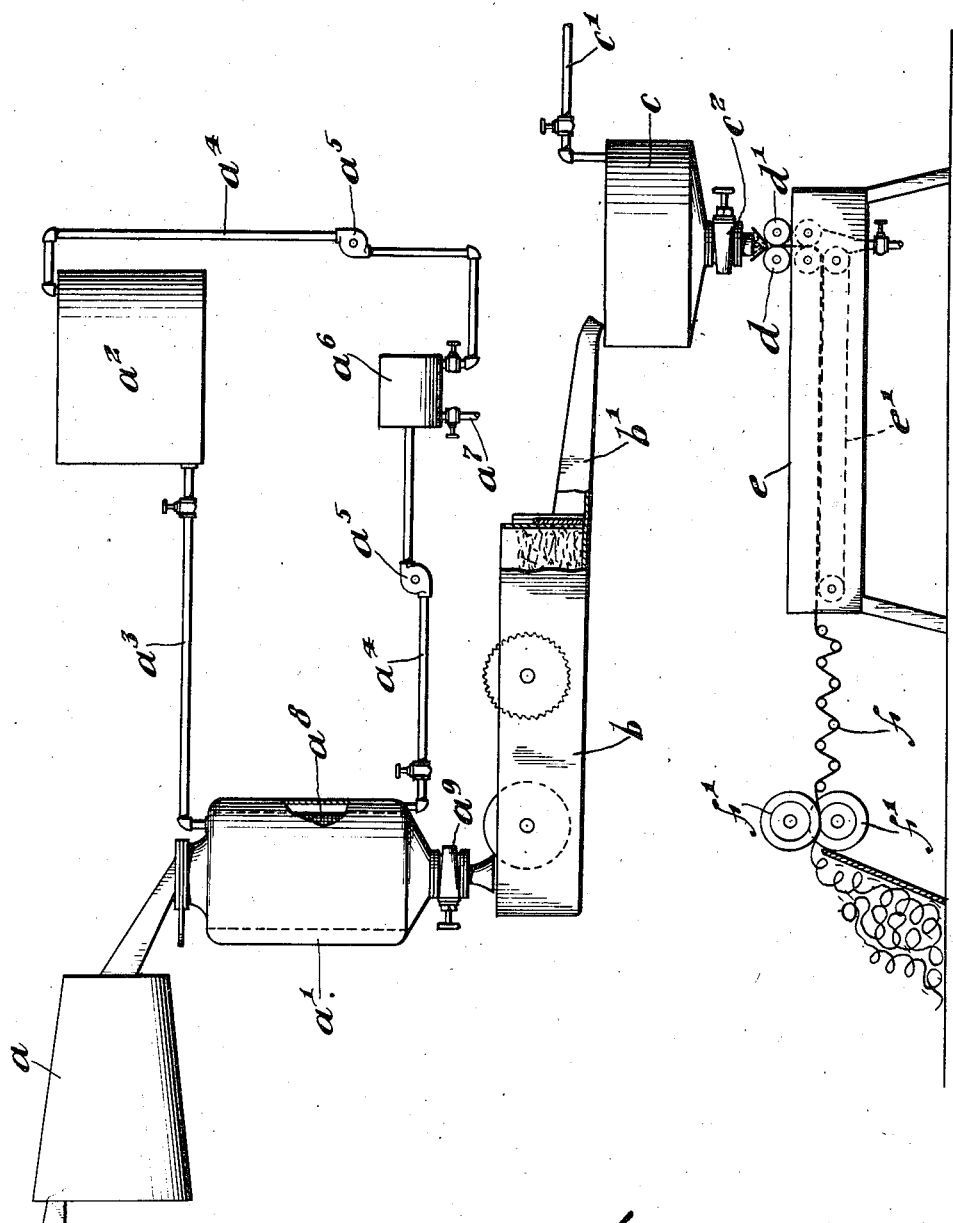

UNITED STATES PATENT OFFICE.

ANDREW C. BORZNER, OF PHILADELPHIA, PENNSYLVANIA.

MANUFACTURE FROM CELLULOSE OF A FIREPROOF SUBSTITUTE FOR EXCELSIOR FOR BEDDING AND PACKING PURPOSES.

1,165,062.   Specification of Letters Patent.   Patented Dec. 21, 1915.

Application filed January 21, 1915. Serial No. 3,466.

*To all whom it may concern:*

Be it known that I, ANDREW C. BORZNER, a citizen of the United States, residing at Germantown, in the city and county of Philadelphia and State of Pennsylvania, have invented certain new and useful Improvements in the Manufacture from Cellulose of a Fireproof Substitute for Excelsior for Bedding and Packing Purposes, of which the following is a specification.

My invention has relation to a manufactured product by chemical and mechanical treatments, as a substitute for "excelsior" for bedding and packing purposes and to the mode of making such a product from cellulose materials, as paper, cornstalk or analogous material, in a fire-proof condition; and in such connection my present invention relates first to the method of production of the said product; and second, to the said chemically prepared and mechanically treated fire-proof artificial product, for the defined purposes.

The nature, characteristic features and scope of my present invention will be more fully understood from the following description taken in connection with the accompanying drawing forming part hereof, showing diagrammatically in plan and in broken section as to parts, a plant in one form adapted for the conduct of the method of producing the artificial fire-proof product of my said invention.

Referring to the drawings $a$, is a shredding or disintegrating container, in which cellulose material, as paper, cornstalk or other analogous materials are introduced to be converted into a condition for the first chemical action to take place thereon in a digester and separating tank $a^1$. In this tank is introduced preferably a hot dilute alkaline solution from a container $a^2$. The said solution may be either caustic-soda or an inorganic salt, as zinc chlorid, in the proportion of four (4) parts by weight of caustic soda or zinc chlorid to about a hundred (100) parts by weight of the shredded or disintegrated waste-product to have removed therefrom foreign matter and prior to being reduced to pulp in the forming container $b$. The product thus treated may then be washed in a tank of clean water, not shown, or it is preferably conducted directly from the tank $a^1$, into the container $c$. This container has introduced into it a solution of preferably ammonium chlorid which is supplied to a batch of pulp in the proportion of five (5) parts by weight of the ammonium chlorid to every hundred (100) parts, by weight of the pulp-stock. Of course, it should be understood, that the proportions above given in both instances may be somewhat varied, without departing from the spirit or scope of my said invention. The last mentioned treatment thoroughly fire-proofs the pulp-mass when it is next compressed into sheet form by passing through a series of squeeze rolls $d$ and $d^1$, to bring into a pliable condition for drying in the kiln $e$, and when dried, the sheet then passes through fluting-means $f$, to a series of rotary cutters $f^1$, of a shredding machine to form the thus treated cut sheets into a light fluffy-like curled condition, for employing then in its fire-proof condition, as a bed-packing product or as a fire-proof general packing product, for various uses, in the applied arts.

The hot alkaline or other solution is supplied from the elevated supply tank $a^2$, by means of controlled piping $a^3$, connected with the digesting and separating tank $a^1$. A return pipe connection $a^4$, is arranged from the tank $a^1$, to the tank $a^2$, with a pump $a^5$, therein, and a filter $a^6$, having a waste outlet pipe $a^7$, from the same. Thus can be conserved previously employed solution after filtering, and supplied to the tank $a^1$, for use again mixed with the solution of the tank $a^2$, in the digesting and separating container $a^1$, and supplied thereto by the controlled piping $a^3$, to act on the contaminated waste stock in said tank $a^1$, to free or separate foreign matter therefrom in the said tank $a^1$. The tank $a^1$, is preferably interiorly arranged with a wire-cage $a^8$, to maintain the stock as a mass while being treated to free foreign matter therefrom. The stock thus freed of its foreign matter is then passed through the controlled piping $a^9$, to the beater container $b$, and from the latter by a trough $b^1$, to the fire-proofing container $c$. This container is provided with a supply pipe $c^1$, for the solution, arranged above the same. It then passes by a controlled discharge throat $c^2$, to and through a series of squeeze rolls $d$ and $d^1$, to a drying machine $e$. This machine is provided with an endless conveyer $e^1$, arranged therein and it then passes to fluting-mechanism $f$, and finally acted upon by a series of cutters $f^1$, to thereby bring the thus treated sheets into a curled fluffy condition for use, in one form of the artificially produced fire-proof product. It will be understood that it can be caused to assume finally other different forms for use, besides the one above mentioned and still be within the scope of my said defined invention. It will be also understood that other than caustic soda may be employed with good results in separating in the first instance the extraneous or foreign matter from the cellulose matter, before actual pulping of the mass; and further that in the fire-proofing of the pulp-mass instead of employing ammonium chlorid, an inorganic salt solution may be employed, as silicate of soda, borax or other equivalents thereof, with good results, in rendering the finally produced product proof against ready firing, exposed to such influence.

This artificially manufactured product as above described in its fire-proof condition is tougher and stronger than "excelsior", it supplants for packing purposes. It is also more dense and dependable for use than excelsior, of so highly inflammable nature, as a packing product. It is far more yielding in quality for packing purposes, because more closely massing than excelsior, and more uniform cushioning results can be obtained in the application of the same, for bedding purposes.

Having thus described the nature and objects of my invention, what I claim as new and desire to secure by Letters Patent is:—

1. A bedding and packing product, consisting of waste paper, cornstalk or the like, chemically and mechanically treated and reduced to a broken or shredded condition for use, substantially as and for the purposes described.

2. A bedding and packing product, consisting of waste paper, cornstalk or the like, chemically and mechanically treated and rendered fire proof and reduced to a broken or shredded condition for use, substantially as and for the purposes described.

3. The mode of making a fire-proof product for bedding and packing, which consists in treating matter derived from cellulose with a solution to remove foreign substance therefrom and to reduce to a pulp-like condition, fire-proofing in a solution and then mechanically treating to bring into a condition which by drying is prepared for being mechanically broken up or shredded, substantially as and for the purposes described.

4. The mode of making a fire-proof product for bedding and packing, which consists in treating matter derived from cellulose with an alkaline solution to remove foreign matter therefrom and to reduce to a pulp-like condition, fire-proofing and then mechanically reducing into sheet form and drying and fluting and finally cutting or shredding, substantially as and for the purposes described.

In witness whereof, I have hereunto set my signature in the presence of the two subscribing witnesses.

ANDREW C. BORZNER.

Witnesses:
  THOMAS M. SMITH,
  ROSE E. SMITH.